United States Patent
Welton et al.

(10) Patent No.: US 9,563,648 B2
(45) Date of Patent: Feb. 7, 2017

(54) DATA ANALYTICS PLATFORM OVER PARALLEL DATABASES AND DISTRIBUTED FILE SYSTEMS

(71) Applicant: EMC IP Holding Company LLC, Hopkinton, MA (US)

(72) Inventors: Caleb E. Welton, Foster City, CA (US); Shengwen Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 101 days.

(21) Appl. No.: 13/840,912

(22) Filed: Mar. 15, 2013

(65) Prior Publication Data

US 2014/0244701 A1    Aug. 28, 2014

Related U.S. Application Data

(60) Provisional application No. 61/769,043, filed on Feb. 25, 2013.

(51) Int. Cl.
*G06F 17/30* (2006.01)

(52) U.S. Cl.
CPC ... *G06F 17/30283* (2013.01); *G06F 17/30224* (2013.01); *G06F 17/30433* (2013.01); *G06F 17/30445* (2013.01); *G06F 17/30463* (2013.01)

(58) Field of Classification Search
CPC .................. G06F 17/30545; G06F 17/30433; G06F 17/30463; G06F 17/30224; G06F 17/30445
USPC ......................................... 707/764, 765, 769
See application file for complete search history.

(56) References Cited

U.S. PATENT DOCUMENTS

| | | | |
|---|---|---|---|
| 5,933,422 A | 8/1999 | Kusano et al. | |
| 7,599,969 B2* | 10/2009 | Mignet et al. | 707/999.002 |
| 7,653,665 B1 | 1/2010 | Stefani et al. | |
| 7,921,130 B2* | 4/2011 | Hinshaw et al. | 707/769 |
| 7,984,043 B1 | 7/2011 | Waas | |
| 8,266,122 B1 | 9/2012 | Newcombe et al. | |
| 8,359,305 B1 | 1/2013 | Burke et al. | |
| 8,572,051 B1 | 10/2013 | Chen et al. | |
| 8,713,038 B2* | 4/2014 | Cohen et al. | 707/764 |
| 8,805,870 B2* | 8/2014 | Chen et al. | 707/769 |
| 8,868,546 B2 | 10/2014 | Beerbower et al. | |
| 2003/0212668 A1 | 11/2003 | Hinshaw et al. | |
| 2004/0030739 A1 | 2/2004 | Yousefi'zadeh | |

(Continued)

FOREIGN PATENT DOCUMENTS

WO    2012050582 A1    4/2012

OTHER PUBLICATIONS

Brad Hedlund, "Understanding Hadoop Clusters and the Network," Bradhedlund.com, 2011, pp. 1-22. Available at http://bradhedlund.com/2011/09/10/understanding-hadoop-clusters-and-the-network/.

*Primary Examiner* — Rehana Perveen
*Assistant Examiner* — Tiffany Thuy Bui
(74) *Attorney, Agent, or Firm* — Van Pelt, Yi & James LLP (57) ABSTRACT

Performing data analytics processing in the context of a large scale distributed system that includes a massively parallel processing (MPP) database and a distributed storage layer is disclosed. In various embodiments, a data analytics request is received. A plan is created to generate a response to the request. A corresponding portion of the plan is assigned to each of a plurality of distributed processing segments, including by invoking as indicated in the assignment one or more data analytical functions embedded in the processing segment.

26 Claims, 5 Drawing Sheets

(56) References Cited

U.S. PATENT DOCUMENTS

| | | |
|---|---|---|
| 2004/0186842 A1 | 9/2004 | Wesemann |
| 2005/0289098 A1 | 12/2005 | Barsness et al. |
| 2008/0059489 A1 | 3/2008 | Han et al. |
| 2008/0195577 A1 | 8/2008 | Fan et al. |
| 2008/0222090 A1 | 9/2008 | Sasaki |
| 2008/0244585 A1 | 10/2008 | Candea et al. |
| 2009/0043745 A1 | 2/2009 | Barsness et al. |
| 2009/0182792 A1 | 7/2009 | Bomma et al. |
| 2009/0234850 A1 | 9/2009 | Kocsis et al. |
| 2009/0254916 A1 | 10/2009 | Bose et al. |
| 2009/0271385 A1 | 10/2009 | Krishnamoorthy et al. |
| 2010/0223305 A1 | 9/2010 | Park et al. |
| 2010/0241827 A1* | 9/2010 | Yu et al. .................. 712/30 |
| 2011/0047172 A1* | 2/2011 | Chen et al. ............... 707/764 |
| 2011/0131198 A1 | 6/2011 | Johnson et al. |
| 2011/0228668 A1 | 9/2011 | Pillai et al. |
| 2011/0231389 A1 | 9/2011 | Surna et al. |
| 2011/0246511 A1 | 10/2011 | Smith et al. |
| 2011/0302164 A1 | 12/2011 | Krishnamurthy et al. |
| 2012/0036146 A1 | 2/2012 | Annapragada |
| 2012/0191699 A1* | 7/2012 | George et al. ............. 707/718 |
| 2012/0259894 A1 | 10/2012 | Varley et al. |
| 2013/0117237 A1 | 5/2013 | Thomsen et al. |
| 2013/0138612 A1 | 5/2013 | Iyer |
| 2013/0166523 A1 | 6/2013 | Pathak et al. |
| 2014/0019683 A1* | 1/2014 | Ishikawa ............ G06F 17/302 711/114 |
| 2014/0067792 A1 | 3/2014 | Erdogan et al. |
| 2014/0095526 A1* | 4/2014 | Harada et al. ............ 707/764 |
| 2014/0108459 A1* | 4/2014 | Gaza et al. ............... 707/792 |
| 2014/0108861 A1 | 4/2014 | Abadi et al. |
| 2014/0122542 A1 | 5/2014 | Barnes et al. |
| 2014/0136590 A1 | 5/2014 | Marty et al. |
| 2014/0149357 A1 | 5/2014 | Gupta |
| 2014/0188841 A1 | 7/2014 | Sun et al. |
| 2014/0195558 A1 | 7/2014 | Murthy et al. |
| 2014/0201565 A1 | 7/2014 | Candea et al. |

* cited by examiner

DATA ANALYTICS PLATFORM OVER PARALLEL DATABASES AND DISTRIBUTED FILE SYSTEMS

CROSS REFERENCE TO OTHER APPLICATIONS

This application claims priority to U.S. Provisional Patent Application No. 61/769,043 entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

BACKGROUND OF THE INVENTION

Distributed storage systems enable databases, files, and other objects to be stored in a manner that distributes data across large clusters of commodity hardware. For example, Hadoop® is an open-source software framework to distribute data and associated computing (e.g., execution of application tasks) across large clusters of commodity hardware.

EMC Greenplum® provides a massively parallel processing (MPP) architecture for data storage and analysis. Typically, data is stored in segment servers, each of which stores and manages a portion of the overall data set. Advanced MPP database systems such as EMC Greenplum® provide the ability to perform data analytics processing on huge data sets, including by enabling users to use familiar and/or industry standard languages and protocols, such as SQL, to specify data analytics and/or other processing to be performed. Examples of data analytics processing include, without limitation, Logistic Regression, Multinomial Logistic Regression, K-means clustering, Association Rules based market basket analysis, Latent Dirichlet based topic modeling, etc.

While distributed storage systems, such as Hadoop®, provide the ability to reliable store huge amounts of data on commodity hardware, such systems have not to date been optimized to support data mining and analytics processing with respect to the data stored in them.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing advanced data analytics capabilities in the context of a large distributed data storage system is disclosed. In various embodiments, a massively parallel processing (MPP) database system is adapted to manage and provide data analytics with respect to data stored in a large distributed storage layer, e.g., an implementation of the Hadoop® distributed storage framework. Examples of data analytics processing include, without limitation, Logistic Regression, Multinomial Logistic Regression, K-means clustering, Association Rules based market basket analysis, Latent Dirichlet based topic modeling, etc. In some embodiments, advanced data analytics functions, such as statistical and other analytics functions, are embedded in each of a plurality of segment servers comprising the MPP database portion of the system. In some embodiments, to perform a data analytics task, such as computing statistics, performing an optimization, etc., a master node selects a subset of segments to perform associated processing, and sends to each segment an indication of the data analytics processing to be performed by that segment, including for example an identification of the embedded data analytics function(s) to be used, and associated metadata required to locate and/or access the subset of data on which that segment is to perform the indicated processing.

Figure 1:
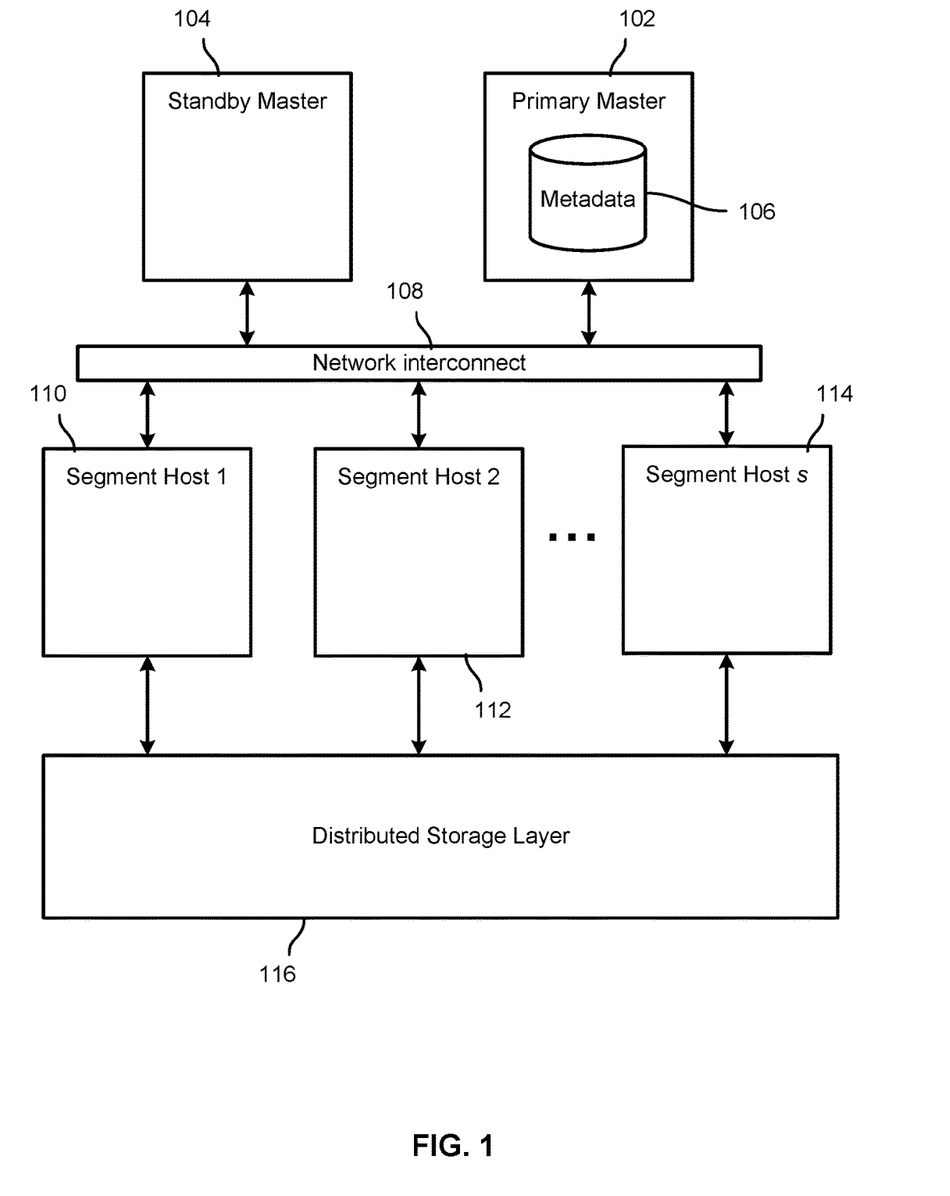
FIG. 1 is a block diagram illustrating an embodiment of a large scale distributed system.

FIG. 1 is a block diagram illustrating an embodiment of a large scale distributed system. In the example shown, the large scale distributed system includes a large cluster of commodity servers. The master hosts include a primary master 102 and a standby master 104. The primary master 102 is responsible for accepting queries; planning queries, e.g., based at least in part on system metadata 106, which in various embodiments includes information indicating where data is stored within the system; dispatching queries to segments for execution; and collecting the results from segments. The standby master 104 is a warm backup of the primary master 102. The network interconnect 108 is used to communicate tuples between execution processes. The compute unit of the database engine is called a "segment". Each of a large number of segment hosts, represented in FIG. 1 by hosts 110, 112, and 114, can have multiple segments. The segments on segment hosts 110, 112, 114, for example, are configured to execute tasks assigned by the primary master 102, such as to perform assigned portions of a query plan with respect to data stored in distributed storage layer 116, e.g., a Hadoop® or other storage layer.

When the master node 102 accepts a query, it is parsed and planned according to the statistics of the tables in the query, e.g., based on metadata 106. After the planning phase, a query plan is generated. A query plan is sliced into many slices. In the query execution phase, for each slice a group of segments, typically comprising a subset of the segments hosted on segment hosts 1 through s, is selected to execute the slice. In various embodiments, the size of the group may be dynamically determined by using the knowledge of the data distribution and available resources, e.g., workload on respective segments, etc.

In various embodiments, a data analytics job or other query may be expressed in whole or in part using SQL and/or any other specified language or syntax. A master node, such as primary master 102, parses the SQL or other input and invokes scripts or other code available on the master to perform top level processing to perform the requested processing. In various embodiments, a query plan generated by the master 102, for example, may identify for each of a plurality of segments a corresponding portion of the global data set to be processed by that segment. Metadata identifying the location of the data to be processed by a particular segment, e.g., with distributed storage layer 116, is sent to the segment by the master 102. In various embodiments, the distributed storage layer 116 comprises data stored in an instance of the Hadoop Distributed File System (HDFS) and the metadata indicates a location within the HDFS of data to be processed by that segment. The master 102 in addition will indicate to the segment the specific processing to be performed. In various embodiments, the indication from the master may indicate, directly or indirectly, one or more analytics functions embedded at each segment which is/are to be used by the segment to perform the required processing.

Figure 2:
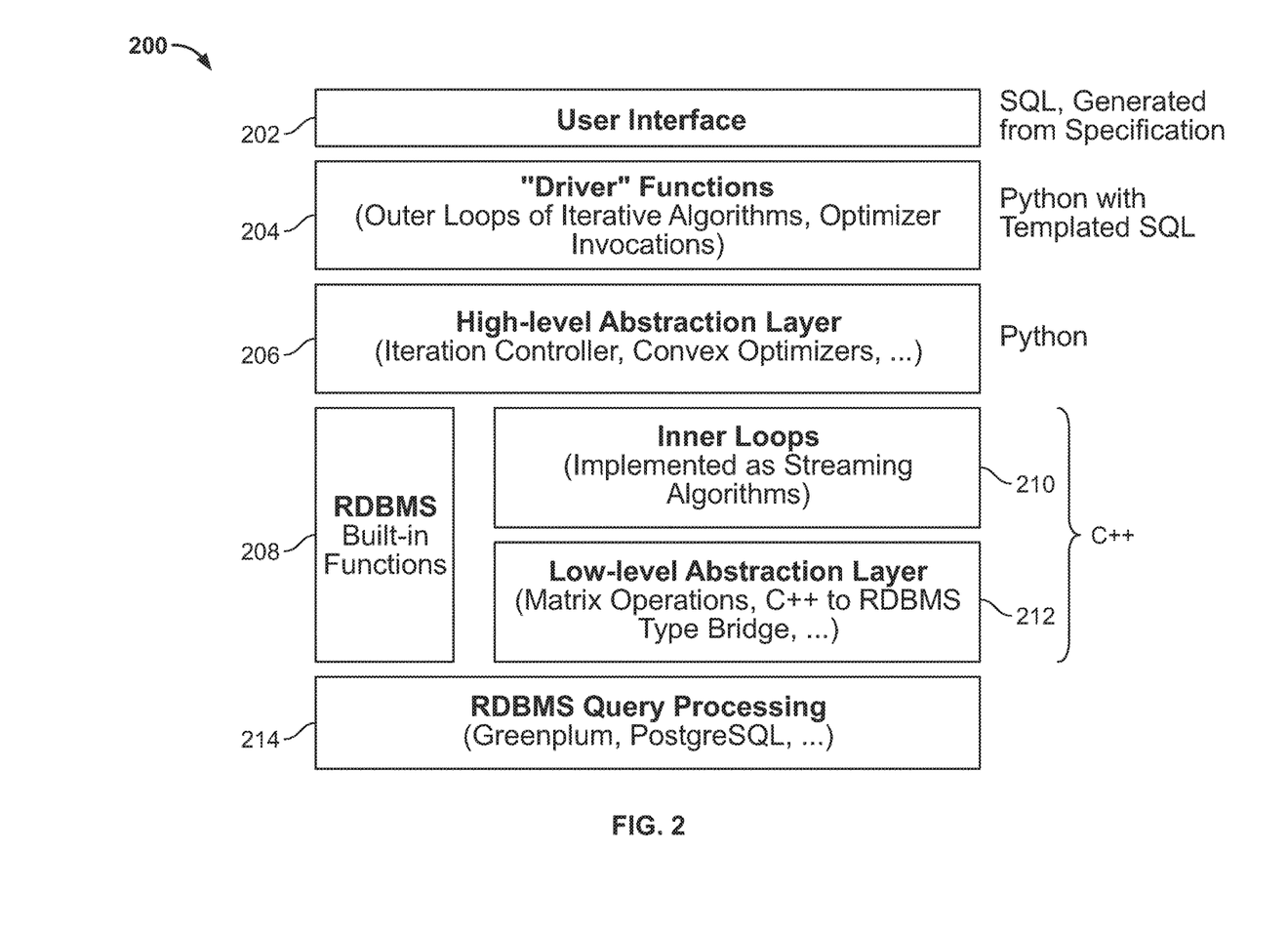
FIG. 2 is a block diagram illustrating an embodiment of a data analytics architecture of a large scale distributed system.

FIG. 2 is a block diagram illustrating an embodiment of a data analytics architecture of a large scale distributed system. In various embodiments, the data analytics architecture 200 of FIG. 2 is implemented in a large scale distributed system, such as the large scale distribute system of FIG. 1. In the example shown, the data analytics architecture 200 includes a user interface 202 that enables data analytics requests to be expressed using SQL, e.g., as indicated by a specification. Various driver functions 204, e.g., python or other scripts with templated SQL in this example, may be invoked to perform, for example, the outer loops of iterative algorithms, optimizer invocations, etc. A high level abstraction layer 206, in this example also comprising python scripts, provides functionality such as an iteration controller, convex optimizers, etc. The upper layers 202, 204, and 206 interact with RDBMS built-in functions 208 and/or with inner loops 210 and/or low-level abstraction layer 212, comprising compiled C++ in this example, to perform lower level tasks required to perform a task received via user interface 202. Data is accessed to perform analytics computations and/or other processing by interacting with an underlying RDBMS query processing layer 214. In various embodiments, one or more of the components shown in FIG. 2 may be implemented across nodes comprising the system, such as across the segments or other processing units comprising the MPP database portion of a large scale distributed system such as the one shown in FIG. 1. In various embodiments, core data analytics processing is performed at least in part using functions embedded in each of the segments (or other processing units) included in the system. In some embodiments, the functions comprise a "shared object" or library of functions comprising compiled C++ or other compiled code, such as Java or Fortran. As a portion of a broader task is assigned to a segment, the segment uses the embedded function(s) implicated by the assignment to perform at least part the data analytics and/or other processing that has been assigned to the segment.

Figure 3:
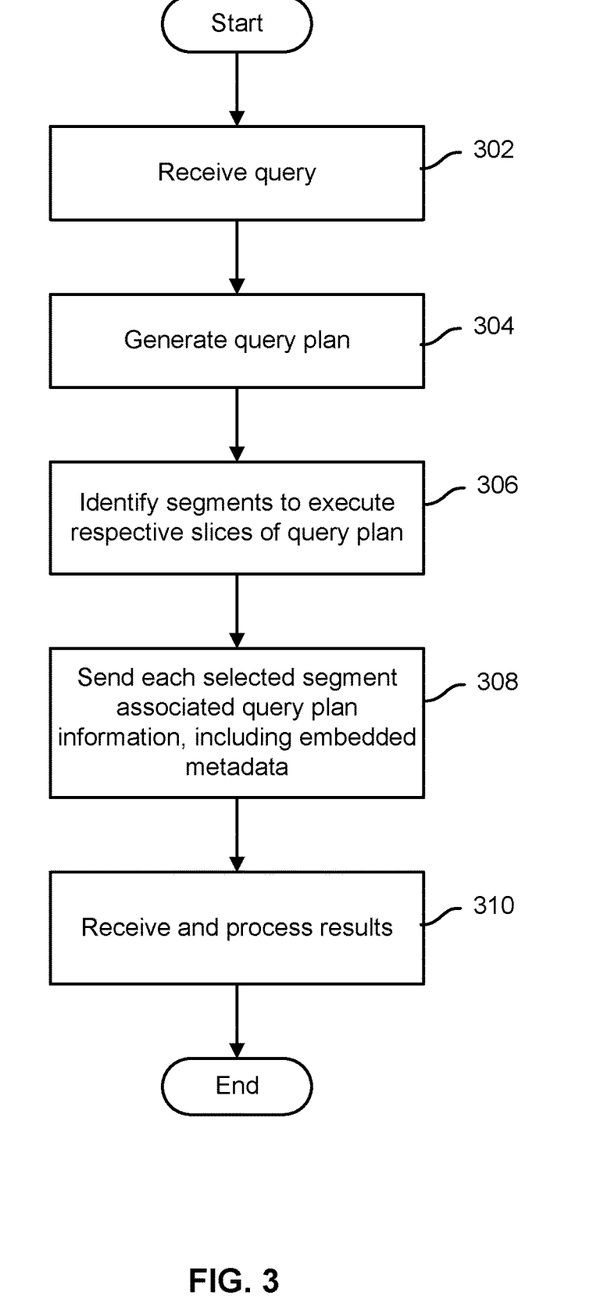
FIG. 3 is a flow chart illustrating an embodiment of a database query processing process.

FIG. 3 is a flow chart illustrating an embodiment of a database query processing process. In some embodiments, a master node, such as primary master 102 of FIG. 1, implements the process of FIG. 3. In the example shown, a query is received (302). Examples of a query include, without limitation, an advanced data analytics request expressed in whole or in part as a set of SQL statements. A query plan is generated (304). The plan is divided into a plurality of slices, and for each slice a corresponding set of segments ("gang") is identified to participate in execution of that slice of the query plan (306). For each slice of the query plan, the segments selected to perform processing required by that slice are sent a communication that includes both the applicable portion of the plan to be performed by that segment and metadata that may be required by a receiving segment to perform tasks assigned to that segment (308). In some embodiments, the metadata included in the query plan slice and/or other communication sent to the respective segments selected to participate in execution of that slice of the plan includes metadata from a central metadata store, e.g., metadata 106 of FIG. 1, and includes information indicating to the segment the location of data with respect to which that segment is to perform query plan slice related processing. In past approaches, typically a segment would store and manage a corresponding portion of the overall data, and sending metadata to perform query plan related tasks would not typically have been necessary. In some embodiments, metadata and/or other data included in assignments sent to selected segments may indicate data analytics processing to be performed, in whole or in part, by the segment using one or more data analytics functions that have been embedded in each of the segments in the distributed system. Query results are received from the respective segments to which query tasks were dispatched, and processed to generate, e.g., at the master node, a master or overall response to the query (310).

Figure 4:
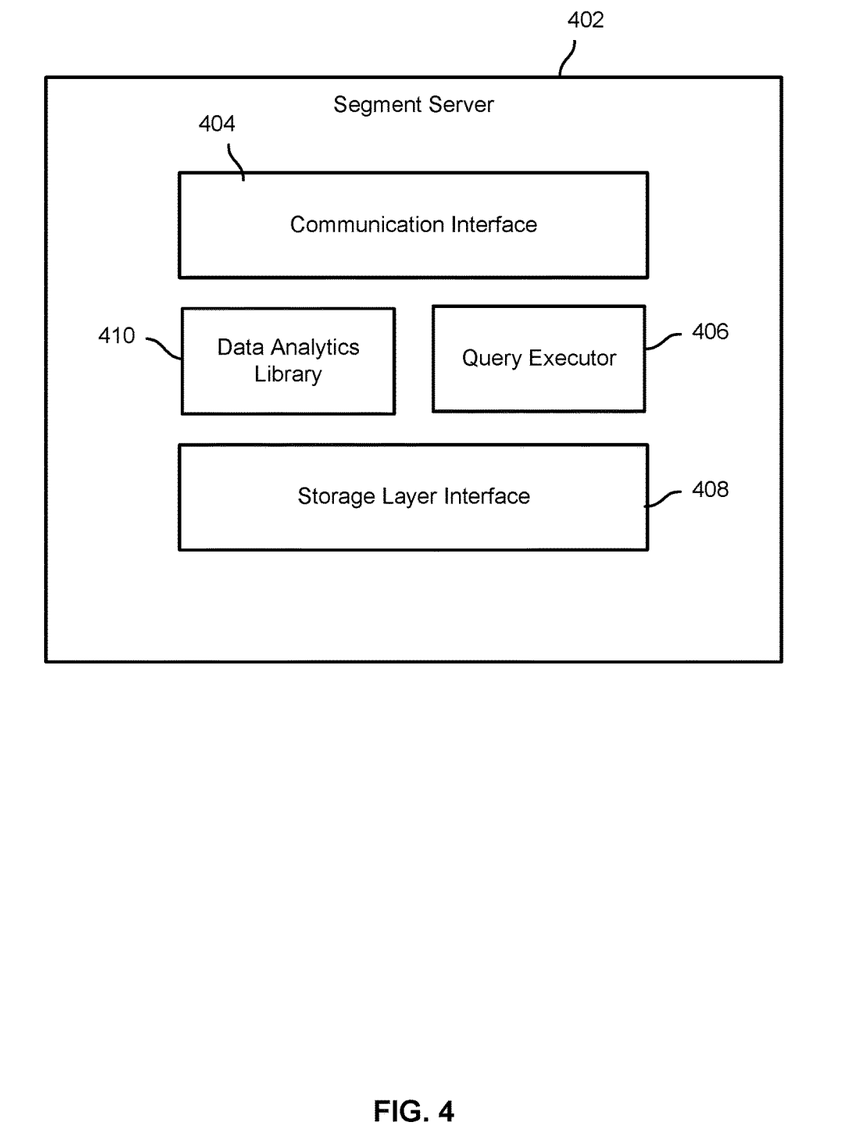
FIG. 4 is a block diagram illustrating an embodiment of a segment server.

FIG. 4 is a block diagram illustrating an embodiment of a segment server. In various embodiments, one or more segment servers such as segment server 402 may be deployed in each of a plurality of segment hosts, such as segment hosts 110, 112, and 114 of FIG. 1. In the example shown, the segment server 402 includes a communication interface 404 configured to received, e.g., via a network interconnect such as interconnect 108 of FIG. 1, a network communication comprising an assignment sent by a master node such as primary master 102 of FIG. 1. A query executor 406 performs processing required to complete tasks assigned by the master node, using in this example a storage layer interface 408 to access data stored in a distributed storage layer, such as distributed storage layer 116 of FIG. 1. One or more data analytics functions included in a shared data analytics library 410 embedded in each segment server in the distributed system may be called to perform data analytics processing, as required to perform the assigned task. Examples of functions that may be embedded in segment servers in various embodiments include, without limitation: User-Defined Functions (e.g. a UDF which randomly initializes an array with values in a specified range, a UDF which transposes a matrix, a UDF which un-nests a 2-dimensional array into a set of 1-dimensional arrays, etc.), step functions, and final functions of various User-Defined Aggregators.

Figure 5:
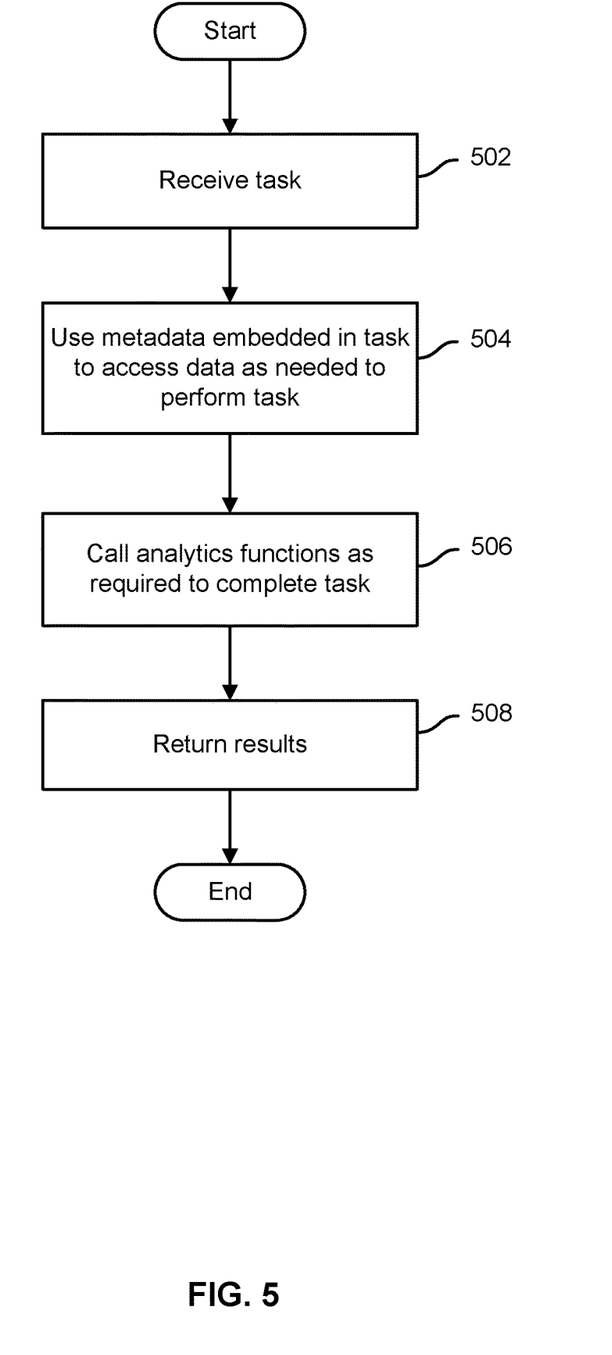
FIG. 5 is a flow chart illustrating an embodiment of a process to perform data analytics processing.

FIG. 5 is a flow chart illustrating an embodiment of a process to perform data analytics processing. In various embodiments, the process of FIG. 5 is performed by a segment server in response to receiving an assignment, e.g., from a master node, to perform an assigned part of a data analytics query plan. In the example shown, an assigned task is received (502). Metadata embedded in the assigned task is used to access data as needed to perform the assigned task(s) (504). Data analytics functions embedded at the segment server or other processing unit are invoked as needed to perform the assigned task (506). Examples of functions that may be embedded in segment servers in various embodiments include, without limitation: a function which does Gibbs sampling for the inference of Latent Dirichlet Allocation, or a function which generates the association rules. Once processing has been completed, a result is returned, for example to the master node from which the assignment was received (508).

Using techniques disclosed herein, a scalable and high-performance data analytics platform can be provided over a high-performance parallel database system built upon a scalable distributed file system. The advantages of parallel databases and distributed file systems are combined to overcome the challenges of big data analytics. Finally, in various embodiments, users are able to use familiar SQL queries to run analytic tasks, and the underlying parallel database engines translate these SQL queries into a set of execution plans, optimized according to data locality and load balances.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    embedding in each of a plurality of distributed processing segments a library or other shared object comprising one or more data analytical functions;
    receiving by a master node a data analysis request;
    creating by the master node a plan to generate a response to the request;
    assigning to each of the plurality of distributed processing segments a corresponding portion of the plan to be performed by that segment, including by invoking as indicated in the assignment one or more data analytical functions embedded in the processing segment;
    obtaining, by the master node, metadata associated with one or more portions of the plan to be performed by one or more corresponding segments, wherein the master node obtains the metadata from a central metadata store wherein the metadata identifies a location data corresponding to the one or more portions of the plan and at least a part of one or more data analytic processing to be performed in connection with processing the corresponding one or more portions of the plan;
    sending, by the master node to each of the plurality of distributed processing segments for which a portion of the plan is assigned, the corresponding portion of the plan to be performed by that segment and the metadata, wherein the metadata is used to locate or access a subset of data on which the segment is to perform an indicated processing;
    receiving, from each of the plurality of distributed processing segments for which a portion of the plan is assigned, a corresponding result of processing the portion of the plan; and
    generating, a master response to the data analysis request based at least in part on the corresponding result of processing the portion of the plan received from each of the plurality of distributed processing segments for which a portion of the plan is assigned.

2. The method of claim 1, wherein the data analysis request comprises one or more SQL statements.

3. The method of claim 1, wherein the data analysis request comprises one or more SQL statements to compute one or more of the following: Logistic Regression, Multinomial Logistic Regression, K-means clustering, Association Rules based market basket analysis, and Latent Dirichlet based topic modeling.

4. The method of claim 1, wherein the data analysis request is received at a master node of a large scale distributed system.

5. The method of claim 1, wherein creating a plan to generate a response to the request includes creating a query plan, slicing the query plan into a plurality of slices, and identifying for each slice a group of processing segments to perform tasks comprising that slice of the query plan.

6. The method of claim 5, wherein the group of processing segments to perform task comprising that slice of the query plan comprises a plurality of processing segments.

7. The method of claim 1, wherein assigning to each of a plurality of distributed processing segments a corresponding portion of the plan to be performed by that segment includes embedding in an assignment communication to be sent to one or more of said plurality of distributed processing segments the metadata, wherein the metadata indicates a location, within a distributed data storage layer, of data to be processed by that segment.

8. The method of claim 7, wherein each of said distributed processing segments is configured to use the metadata to access said data to be processed by that segment.

9. The method of claim 7, wherein the distributed data storage layer comprises data stored in an instance of a Hadoop Distributed File System (HDFS) and the metadata indicates a location within the HDFS of data to be processed by that segment.

10. The method of claim 1, wherein said library or other shared object is included in the processing segments as deployed.

11. The method of claim 1, wherein said library or other shared object embodies said one or more data analytical functions in the form of one or more of the following: compiled C++ code, compiled Java, compiled Fortran, or other compiled code.

12. The method of claim 1, wherein the plurality of distributed processing segments comprise a subset of parallel processing segments comprising a massively parallel processing (MPP) database system.

13. The method of claim 1, wherein the metadata sent to each of the plurality of distributed processing segments for which a portion of the plan is assigned includes an identification of an embedded data analytics function to be used to process the portion of the plan.

14. The method of claim 13, wherein the embedded data analytics function includes a User-Defined function, a step function, or a final function of a User-Defined Aggregator.

15. The method of claim 1, wherein the metadata sent to each of the plurality of distributed processing segments is sent in conjunction with the corresponding portion of the plan to be performed by that segment.

16. The method of claim 15, wherein the metadata sent to each of the plurality of distributed processing segments is sent as part of the corresponding portion of the plan to be performed by that segment.

17. A system, comprising:
a communication interface; and
one or more processors coupled to the communication interface and configured to:
  embedding in each of a plurality of distributed processing segments a library or other shared object comprising one or more data analytical functions;
  receive a data analysis request;
  create a plan to generate a response to the request;
  assign to each of the plurality of distributed processing segments, via a communication sent via the communication interface, a corresponding portion of the plan to be performed by that segment, including by invoking as indicated in an assignment the one or more data analytical functions embedded in the processing segment;
  obtain metadata associated with one or more portions of the plan to be performed by one or more corresponding segments, wherein a master node obtains the metadata from a central metadata store wherein the metadata identifies a location data corresponding to the one or more portions of the plan and at least a part of one or more data analytic processing to be performed in connection with processing the corresponding one or more portions of the plan;
  send, to each of the plurality of distributed processing segments for which a portion of the plan is assigned, the corresponding portion of the plan to be performed by that segment and the metadata wherein the metadata is used to locate or access a subset of data on which the segment is to perform an indicated processing;
  receive, from each of the plurality of distributed processing segments for which a portion of the plan is assigned, a corresponding result of processing the portion of the plan; and
  generate, a master response to the data analysis request based at least in part on the corresponding result of processing the portion of the plan received from each of the plurality of distributed processing segments for which a portion of the plan is assigned.

18. The system of claim 17, wherein the data analysis request comprises one or more SQL statements.

19. The system of claim 17, wherein the data analysis request is received at a master node of a large scale distributed system.

20. The system of claim 17, wherein the one or more processors are configured to create the plan to generate a response to the request at least in part by creating a query plan, slicing the query plan into a plurality of slices, and identifying for each slice a group of processing segments to perform tasks comprising that slice of the query plan.

21. The system of claim 17, wherein the one or more processors are configured to assign to each of a plurality of distributed processing segments a corresponding portion of the plan to be performed by that segment at least in part by embedding in the communication to be sent via the communication interface to one or more of said plurality of distributed processing segments the metadata, wherein the metadata indicates a location, within a distributed data storage layer, of data to be processed by that segment.

22. The system of claim 21, wherein each of said distributed processing segments is configured to use the metadata to access said data to be processed by that segment.

23. The system of claim 17, wherein each of said distributed processing segments has embedded therein a library or other shared object comprising said one or more data analytical functions.

24. The system of claim 17, wherein the plurality of distributed processing segments comprise a subset of parallel processing segments comprising a massively parallel processing (MPP) database system.

25. A computer program product embodied in a tangible, non-transitory computer readable storage medium, comprising computer instructions for:
  embedding in each of a plurality of distributed processing segments a library or other shared object comprising one or more data analytical functions;
  receiving a data analysis request;
  creating a plan to generate a response to the request;
  assigning to each of the plurality of distributed processing segments a corresponding portion of the plan to be performed by that segment, including by invoking as indicated in the assignment the one or more data analytical functions embedded in the processing segment;
  obtain metadata associated with one or more portions of the plan to be performed by one or more corresponding segments wherein a master node obtains the metadata from a central metadata store wherein the metadata identifies a location data corresponding to the one or more portions of the plan and at least a part of one or more data analytic processing to be performed in connection with processing the corresponding one or more portions of the plan;
  sending, to each of the plurality of distributed processing segments for which a portion of the plan is assigned, the corresponding portion of the plan to be performed by that segment and metadata used to locate or access a subset of data on which the segment is to perform an indicated processing;
  receiving, from each of the plurality of distributed processing segments for which a portion of the plan is assigned, a corresponding result of processing the portion of the plan; and
  generating, a master response to the data analysis request based at least in part on the corresponding result of processing the portion of the plan received from each of the plurality of distributed processing segments for which a portion of the plan is assigned.

26. The computer program product of claim 25, wherein assigning to each of a plurality of distributed processing segments a corresponding portion of the plan to be performed by that segment includes embedding in an assignment communication to be sent to one or more of said plurality of distributed processing segments a metadata indicating a location, within a distributed data storage layer, of data to be processed by that segment.

* * * * *